Sept. 22, 1964 L. C. CHOUINGS 3,149,701
DISC BRAKES

Filed Oct. 2, 1962 2 Sheets-Sheet 1

INVENTOR
Leslie C. Chouings
BY
Lawrence J. Winter
ATTORNEY

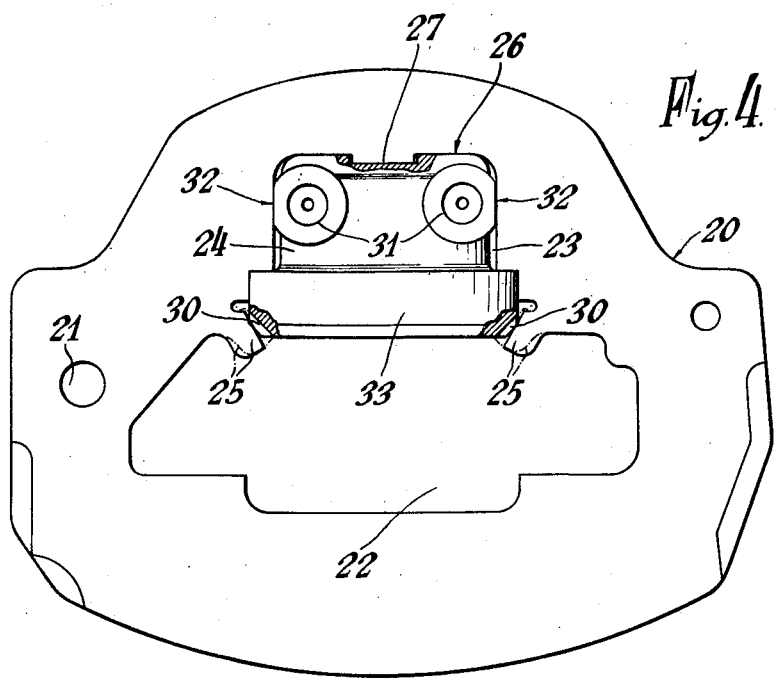
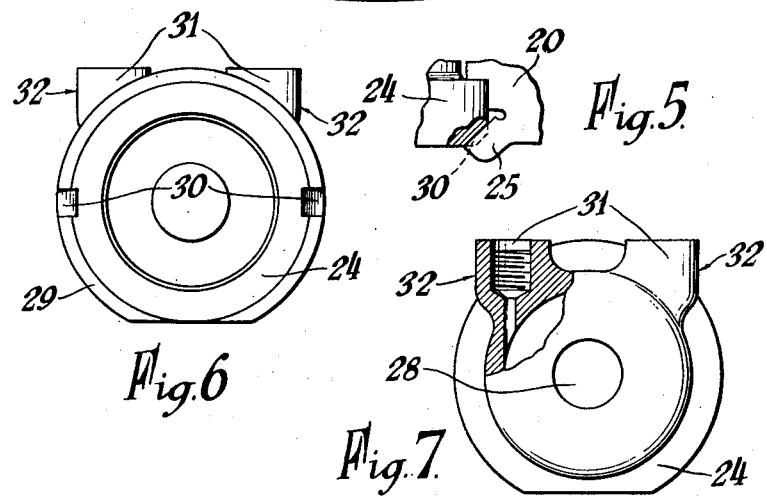

United States Patent Office 3,149,701
Patented Sept. 22, 1964

3,149,701
DISC BRAKES
Leslie C. Chouings, Leamington Spa, England, assignor to Automotive Products Company Limited, Leamington Spa, England
Filed Oct. 2, 1962, Ser. No. 227,808
Claims priority, application Great Britain, Oct. 6, 1961, 36,051/61
5 Claims. (Cl. 188—73)

This invention relates to fluid pressure operated disc brakes of the kind having a movable member, a fixed support therefor and brake actuating means comprising a hydraulic or other fluid pressure cylinder or cylinders carried by the movable member. Disc brakes of this kind will therefore be referred to in the present specification as "disc brakes of the kind hereinbefore set forth."

Hitherto, in various prior constructions of disc brakes of the kind hereinbefore set forth, it has been proposed to secure the cylinder or cylinders in position on the movable member by for example, rivets or bolts or by clamping means such as by the provision of lugs on each cylinder locatable between clamping means forming part of or provided on the movable member. The present invention however, provides a construction which enables the cylinder or cylinders to be secured in position without the use of the means disclosed above. To this end, in accordance with the invention it is proposed to provide the movable member with an opening to receive a cylinder the opening being formed so that the cylinder can be securely wedged in position when pressed therein.

According to one arrangement assembly of the cylinder can be effected by pressing the same, in the radial direction of the cylinder, into the opening, surfaces on the cylinder and the edges of the opening co-operating to effect wedging of the cylinder in the opening an interference fit being provided between the cylinder and opening. In a further arrangement, assembly of the cylinder can be effected by inserting the cylinder, in the axial direction of the cylinder, into the opening to cause wedging engagement between co-operating surfaces on the cylinder and edge of the opening, the cylinder being further secured in position by engaging projections on the movable member in recesses in the cylinder.

The present invention is particularly applicable to disc brakes of the kind hereinbefore set forth as disclosed in the specifications of our copending British applications Nos. 31385/60 or 35727/60. Accordingly embodiments of the invention, as applied to a disc brake of the kind described in our copending British application No. 35727/60 will now be described by way of example by aid of the accompanying diagrammatic drawing in which:

FIGURE 4 is a plan view of the movable member of the disc brake having a single hydraulic cylinder providing the brake actuating means, the cylinder being secured in a manner according to a further embodiment;

FIGURE 5 is a fragmentary view to show the subsequent operation for securing the hydraulic cylinder;

FIGURES 6 and 7 are front and rear views respectively of the hydraulic cylinder for the embodiment of FIGURE 4.

The specification of British application No. 35727/60 discloses broadly a disc brake of the kind hereinbefore set forth wherein the movable member is pivotally mounted so as to be swingable about an axis perpendicular to or substantially perpendicular to the drag force resultant and disposed parallel to the plane of rotation of the brake disc. In particular the said prior specification discloses a disc brake of the kind hereinbefore set forth which comprises a fixed support, a movable member in the form of a closed loop perpendicular to the plane of rotation of the brake disc so as to encircle the brake pads and a peripheral portion of the brake disc, said movable member being pivotally mounted on the fixed support so as to be swingable about an axis perpendicular to or substantially perpendicular to the drag force resultant and disposed parallel to the plane of rotation of the brake disc and brake actuating means carried by the movable member so as to be located on one side of the brake disc and operable to move the pad or pads on that side of the brake disc into contact with the brake disc such contact resulting in swinging movement of the movable member to bring the pad or pads on the other side of the brake disc into contact therewith.

According to one particular arranegment disclosed in the specification of the copending application the closed loop movable member is flat, the same comprising for example a single flat plate or at least two flat plates arranged one on the other and secured together to form a unitary structure. In the accompanying drawings the present invention is applied to a movable member of this lattter particular construction.

Figure 1:
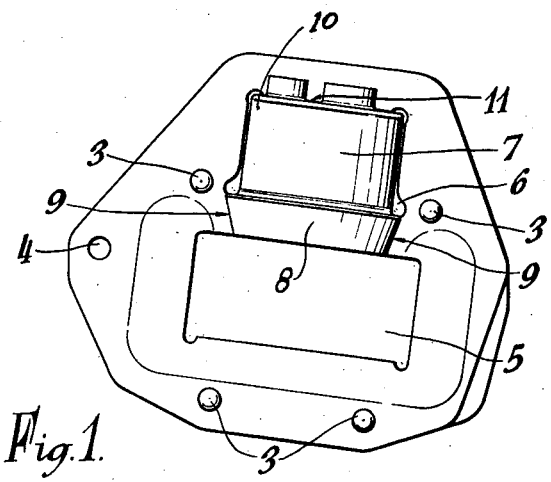
FIGURE 1 is a plan view of the movable member of the disc brake having a single hydraulic cylinder providing the brake actuating means, the cylinder being secured in a manner according to one embodiment of the invention.
Figure 2:
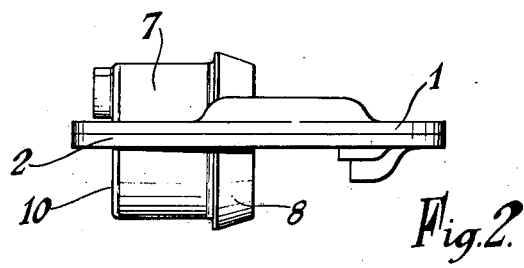
FIGURE 2 is a view as seen from the left of FIGURE 1.

Referring to FIGURES 1 and 2 of the accompanying drawings the movable member therefor consists of two metal plates 1 and 2 arranged one on the other and secured together by rivets 3 to provide a unitary structure. The plates are also provided with a hole 4 passing through the thickness of both plates, to receive a pivot pin, not shown, which is carried by the fixed support, also not shown.

The plates are provided with an opening, the portion 5 of which receives the peripheral portion of the brake disc and the brake pads on either side thereof, the portion 6 of the opening being adapted to receive a hydraulic cylinder 7 disposed on one side of the brake disc, the outer end of the piston in the cylinder being arranged opposite to one face of the brake pad on the same side of the brake disc.

In applying the construction of the present invention to the movable member, the body of the hydraulic cylinder 7 is formed externally with a tapered shoulder 8, surrounding the open end of the cylinder, the tapered shoulder co-operating with correspondingly tapered edge portions 9 of the opening portion receiving the cylinder, the said tapered edge portions being arranged on opposite sides of the said opening portion so as to extend inwardly thereof and at an angle in relation to the axis of the hydraulic cylinder the co-operating surfaces being dimensioned to provide an interference fit. The hydraulic cylinder 7 is assembled by forcing the same into the opening portion 6 in the radial direction of the cylinder so that as the cylinder is pressed into the opening the co-operating tapered surfaces 8 and 9 tend to urge the cylinder in an axial direction such that the closed end 10 of the same is forced into contact with an opposite edge 11 of the opening. The cylinder can therefore be securely wedged in position, the tapered edge portions of the opening in the movable member providing abutments, which locate the cylinder in the axial direction.

Figure 3:
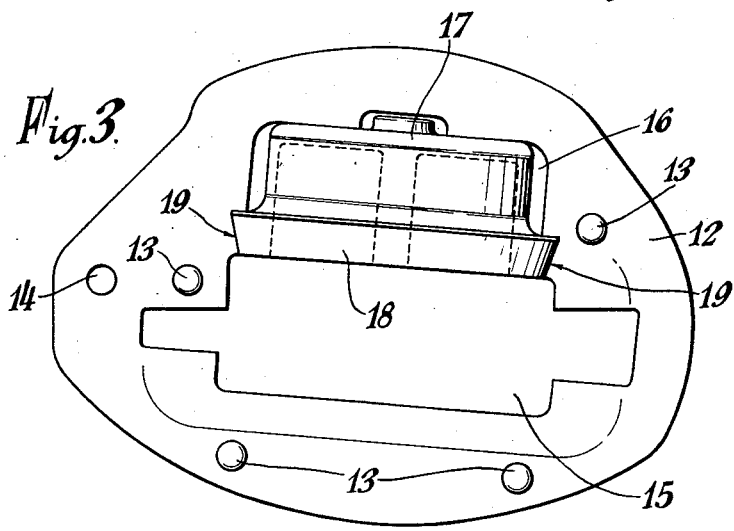
FIGURE 3 is a plan view of a movable member for a disc brake in which the brake actuating means carried by the movable member consists of two hydraulic cylinders arranged side by side in a common body, the cylinder unit being secured as in FIGURE 1.

The movable member shown in FIGURE 3 of the accompanying drawings is also constructed from two metal plates 12 arranged one on top of the other the plates being secured by rivets 13 to provide the unitary structure, and having a hole 14 to receive the pivot pin for the pivotal mounting of the movable member. The opening portion 15 in the plates is formed to receive the the peripheral portion of the brake disc and the brake pads disposed on opposite sides of the brake disc whilst the opening portion 16 is adapted to receive a hydraulic cylinder unit consisting of a pair of hydraulic cylinders arranged side by side in a common body 17. The body, which is cylindrical has a tapered external shoulder 18, which co-operates with correspondingly tapered edge portions 19 of the opening portion 16. Assembly of the body is effected as described above in connection with FIGURES 1 and 2 of the drawings. Each cylinder of the cylinder unit has a connection (not shown) for coupling each said cylinder independently to the pressure liquid source. Thus hydraulic liquid can be supplied simultaneously to both cylinders to effect brake actuation. Should the connection to one of the hydraulic cylinders fail then brake actuation will still be effected by operation of the other cylinder.

In the embodiment disclosed in FIGURES 4 to 7 of the accompanying drawings the movable member denoted generally by reference numeral 20 also consists of two metal plates arranged one on top of the other and secured together to provide the unitary structure, a hole 21 being provided to receive a pivot pin for the pivotal mounting of the movable member. The opening portion 22 in the plates is formed to receive the peripheral portion of the brake disc and the brake pads disposed on opposite sides of the brake disc whilst the opening portion 23 is adapted to receive the hydraulic cylinder 24.

The edges at either side of the gap between the opening portions 22 and 23 are each formed to provide tongues 25 and the edge 26 of the opening portion 23 is formed to provide a tongue 27 which projects into the opening. The hydraulic cylinder 24 is provided externally at its closed end with a circular recess 28, the opposite or open end of the cylinder having a peripheral chamfer 29 and a pair of diametrically disposed slots 30 extending across the chamfered periphery. The hydraulic cylinder 24 is assembled by placing the same in the opening and aligning the recess 28 with the tongue 27 and the slots 30 with the tongues 25. The hydraulic cylinder is then pressed into the opening in the axial direction of the cylinder so that the tongue 27 wedges in the recess 28, the said tongue being an interference fit in the recess. Similarly the enlarged diameter portion 33 around the open end of the cylinder is an interference fit in the opening portion. Final securing of the cylinder is obtained by pressing the tongues 25 into the slots 30 as shown in FIGURE 5. The hydraulic cylinder is therefore firmly wedged in position and located axially and radially. Advantageously each of the hydraulic liquid connections 31 of the hydraulic cylinder 24 is provided with a flat surface 32, each of which contacts the opposite edge of the opening portion 23 to provide guide means for the cylinder during assembly of the hydraulic cylinder.

If desired the hydraulic cylinder or cylinder unit can additionally be secured by welding or brazing, for example along the closed end thereof and along the co-operating tapered surfaces. Further the opening portion in which the hydraulic cylinder or cylinder unit is positioned can be formed so that a clearance extending in the axial direction of the cylinder is provided between the edges of the opening and the external wall of the cylinder or cylinder unit as shown in FIGURES 1 and 3 and 4.

The provision of co-operating tapered surfaces on the hydraulic cylinder and movable member has the advantage of increasing the wedging effect, and in the particular embodiments described serve to resist displacement of the hydraulic cylinder in the axial direction thereof relative to the movable member, particularly under the loads arising during a braking operation.

I claim:
1. A movable member for a disc brake consisting of a substantially flat closed loop structure with a first opening having a peripheral edge for receiving a disc brake therethrough, another opening adjacent said first opening for receiving a brake-actuating cylinder, said another opening having parallel opposite edges, and a rear edge perpendicular to said opposite edges, said another opening being provided with spaced opposed tapered edges joining the edge of said first opening, and an actuating cylinder having a corresponding tapered shoulder wedged between said spaced tapered edges and said rear edge, whereby said cylinder and loop are secured together without external clamping means.

2. The member of claim 1 wherein said cylinder and loop structure are secured together by a press fit.

3. The member of claim 2 wherein said spaced tapered edges have their outer ends disposed farther apart than their inner ends, and said edges extend at an angle with respect to the main axis of said first opening.

4. In combination a movable member and a brake-actuating cylinder, said member comprising a continuous closed loop made of at least two flat metal plates secured together by rivets, a central opening in said loop consisting of an open portion for receiving a brake disc therein and having an inner peripheral edge, and another open portion contiguous to said open portion, said open portion and another open portion having perpendicular main axes, a brake cylinder disposed in said another open portion with its main axis disposed parallel to the axis of said another open portion, and corresponding tapered shoulders on the circumference of said cylinder and said another open portion adjacent said open portion for wedging said cylinder between the tapered surfaces of said another open portion, the rear of said cylinder being disposed in abutting relation against a rear edge of said another open portion.

5. A movable member consisting of closed loop plate members secured together and having an opening therein, and a brake cylinder secured in said opening, said opening being substantially T-shape, the top of the T forming a peripheral edge for receiving a brake disc and pads extending therein, said cylinder being disposed in said bottom portion of the T, with a projecting tongue in the bottom peripheral edge of the T, and the bottom of the cylinder having a recess to receive it, an enlarged diameter portion on said cylinder adjacent the top of said T with oppositely disposed slots in said diameter portion, and oppositely disposed tongue members disposed on the peripheral edge of said T and extending into said slots to wedge said cylinder in said movable member.

References Cited in the file of this patent

UNITED STATES PATENTS

| | | |
|---|---|---|
| 2,873,005 | Butler | Feb. 10, 1959 |
| 2,955,681 | Burnett | Oct. 11, 1960 |
| 2,966,964 | Brueder | Jan. 3, 1961 |
| 3,065,829 | Bessler et al. | Nov. 27, 1962 |